(12) United States Patent
Pinto et al.

(10) Patent No.: US 8,191,042 B2
(45) Date of Patent: May 29, 2012

(54) CONTINUATION BASED DECLARATIVE DEFINITION AND COMPOSITION

(75) Inventors: Edmund Samuel Victor Pinto, Duvall, WA (US); Kenneth David Wolf, Seattle, WA (US); Geoffrey M. Kizer, Seattle, WA (US); Donald F. Box, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 12/060,794

(22) Filed: Apr. 1, 2008

(65) Prior Publication Data

US 2009/0222827 A1 Sep. 3, 2009

Related U.S. Application Data

(63) Continuation-in-part of application No. 12/040,567, filed on Feb. 29, 2008.

(51) Int. Cl.
*G06F 9/44* (2006.01)
*G06F 9/46* (2006.01)

(52) U.S. Cl. ........ 717/117; 717/100; 717/106; 717/115; 717/116; 718/102

(58) Field of Classification Search .................. None
See application file for complete search history.

(56) References Cited

U.S. PATENT DOCUMENTS

| | | | |
|---|---|---|---|
| 5,742,806 A | 4/1998 | Reiner et al. | |
| 5,822,585 A | 10/1998 | Noble | |
| 5,956,512 A | 9/1999 | Simmons | |
| 5,970,498 A | 10/1999 | Duffield | |
| 6,014,666 A | 1/2000 | Helland et al. | |
| 6,067,413 A | 5/2000 | Gustafsson et al. | |
| 6,163,774 A | 12/2000 | Lore | |
| 6,182,277 B1* | 1/2001 | DeGroot et al. | 717/115 |
| 6,542,891 B1 | 4/2003 | Loen et al. | |
| 6,553,268 B1 | 4/2003 | Schwenke | |
| 6,678,696 B1* | 1/2004 | Helland et al. | 1/1 |
| 6,718,535 B1 | 4/2004 | Underwood | |
| 6,738,968 B1 | 5/2004 | Bosworth et al. | |
| 6,757,887 B1* | 6/2004 | Kaplan et al. | 717/106 |
| 6,901,578 B1* | 5/2005 | Beaven et al. | 717/103 |
| 7,043,722 B2 | 5/2006 | Bau, III | |
| 7,150,010 B1 | 12/2006 | Ringseth et al. | |
| 7,203,866 B2 | 4/2007 | Di Fabbrizio | |
| 7,225,425 B2 | 5/2007 | Kompalli et al. | |
| 7,254,809 B2 | 8/2007 | Kurhekar et al. | |

(Continued)

OTHER PUBLICATIONS

On model Checking the Dynamics of Object-based Software (332 pages) http://www.ctit.utwente.nl/library/phd/distefano.pdf.

(Continued)

*Primary Examiner* — Tuan Dam
*Assistant Examiner* — Zheng Wei
(74) *Attorney, Agent, or Firm* — Workman Nydegger

(57) ABSTRACT

Declarative definition and composition of activities of a continuation based runtime. When formulating such a declarative activity of a continuation-based runtime, the activity may be formulated in accordance with a declarative activity schema and include a properties portion that declaratively defines one or more interface parameters of the declarative activity, and a body portion that declaratively defines an execution behavior of the declarative activity. The declarative activities may be hierarchically structured such that a parent declarative activity may use one or more child activities to define its behavior, where one or more of the child activities may also be defined declaratively.

10 Claims, 4 Drawing Sheets

U.S. PATENT DOCUMENTS

| | | | |
|---|---|---|---|
| 7,356,767 B2 | 4/2008 | Dahyabhai | |
| 7,398,525 B2* | 7/2008 | Leymann et al. | 718/104 |
| 7,451,392 B1* | 11/2008 | Chalecki et al. | 715/234 |
| 7,496,887 B2* | 2/2009 | Grasselt et al. | 717/101 |
| 7,606,824 B2* | 10/2009 | Sanabria et al. | 705/7.26 |
| 7,607,123 B2 | 10/2009 | Chavan | |
| 7,734,958 B1 | 6/2010 | Di Fabbrizio | |
| 7,761,586 B2 | 7/2010 | Olenick | |
| 7,774,699 B2 | 8/2010 | Lin | |
| 7,813,741 B2 | 10/2010 | Hendrey | |
| 7,836,428 B2* | 11/2010 | Mitchell et al. | 717/117 |
| 7,966,605 B1 | 6/2011 | Di Fabbrizio | |
| 8,019,770 B1 | 9/2011 | Hartsook | |
| 2003/0105654 A1* | 6/2003 | MacLeod et al. | 705/7 |
| 2004/0044987 A1* | 3/2004 | Kompalli et al. | 717/100 |
| 2005/0050069 A1* | 3/2005 | Vaschillo et al. | 707/100 |
| 2005/0097514 A1 | 5/2005 | Nuss | |
| 2005/0114771 A1 | 5/2005 | Piehler | |
| 2006/0041872 A1 | 2/2006 | Poznanovic et al. | |
| 2006/0064574 A1* | 3/2006 | Rolfs | 713/1 |
| 2006/0074704 A1* | 4/2006 | Shukla et al. | 705/1 |
| 2006/0074730 A1* | 4/2006 | Shukla et al. | 705/8 |
| 2006/0074732 A1* | 4/2006 | Shukla et al. | 705/8 |
| 2006/0074737 A1 | 4/2006 | Shukla et al. | |
| 2006/0242173 A1* | 10/2006 | Tsyganskiy et al. | 707/100 |
| 2006/0248519 A1 | 11/2006 | Jaeger et al. | |
| 2007/0033659 A1 | 2/2007 | Hoche et al. | |
| 2007/0044144 A1 | 2/2007 | Knouse | |
| 2007/0061799 A1 | 3/2007 | Kimmerly | |
| 2007/0083813 A1 | 4/2007 | Lui et al. | |
| 2007/0168327 A1 | 7/2007 | Lindblad | |
| 2007/0233969 A1 | 10/2007 | Shukla et al. | |
| 2007/0239498 A1 | 10/2007 | Shukla et al. | |
| 2007/0239499 A1 | 10/2007 | Shukla et al. | |
| 2007/0239505 A1 | 10/2007 | Shukla et al. | |
| 2007/0288223 A1* | 12/2007 | Werkmann et al. | 703/22 |
| 2007/0300185 A1* | 12/2007 | Macbeth et al. | 715/825 |
| 2008/0120594 A1* | 5/2008 | Lucas et al. | 717/105 |
| 2008/0140645 A1 | 6/2008 | Denoual | |
| 2008/0216094 A1 | 9/2008 | Anderson | |
| 2008/0320031 A1 | 12/2008 | Denoual | |
| 2009/0150854 A1* | 6/2009 | Elaasar et al. | 717/104 |
| 2009/0222794 A1 | 9/2009 | Pinto | |
| 2009/0259514 A1 | 10/2009 | Kumar | |

OTHER PUBLICATIONS

Specializing Continuations a Model for Dynamic Join Points (13 pages) http://delivery.acm.org/10.1145/1240000/1233840/p45-dutchyn.pdf?key1=1233840&key2=6134712911&coll=GUIDE&dl=GUIDE&CFID=38693618&CFTOKEN=41733587.

Continuation Based Control in the Implementation of Parallel Logic Programs (23 pages) http://www.cs.uoregon.edu/~conery/PDF/ConeryLASC94.pdf.

Continuation Based Partial Evaluation (12 pages) http://www.diku.dk/~julia/lawall-danvy-lfp94.ps.gz.

Continuation-based Partial Evaluation without Continuations. (21 pages) http://citeseer.ist.psu.edu/cache/papers/cs/27529/http:zSzzSzwww.informatik.uni-freiburg.dezSz~thiemannzSzpaperszSzcontwocont.pdf/thiemann03continuationbased.pdf.

Java Unified Expression Language (19 pages) http://juel.sourceforge.net/juel.pdf.

Chung et al., Expression Language Specification Version 2.1, published by Sun Microsystems, Inc., Final Release—May 8, 2006, pp. 1-108.

Lubke et al., Unified Expression Language, published by Sun Microsystems, Inc., Aug. 2005, pp. 1-9.

Office Action dated Sep. 28, 2011 cited in U.S. Appl. No. 12/040,567.

* cited by examiner

CONTINUATION BASED DECLARATIVE DEFINITION AND COMPOSITION

CROSS-REFERENCE TO RELATED APPLICATIONS

This application is a continuation-in-part of U.S. patent application Ser. No. 12/040,567, filed Feb. 29, 2008, entitled "Unified Expression And Location Framework", which is herein incorporated by reference in its entirety.

BACKGROUND

One type of software is referred to as a "runtime". A runtime provides underlying functionality that can be used by multiple applications that run on a computing system. One distinct type of runtime is called a "continuation based runtime". A continuation based runtime executes activities. An activity represents a unit of executable code that consists of multiple pulses of work. For instance, suppose an activity is to receive messages. In that case, one pulse of work might be to set up the computing system with proper configuration and state to receive messages, and then pause until a message is received. Another pulse of work might occur when a message is received, which might involve setting up the message so that data can be extracted from the message. Another pulse of work might be to extract the data from the message itself, and so forth.

One of the ways an activity can execute multiple pulses of work is through the scheduling of child activities. This composition of activities enables custom control flows that can be implemented through the scheduling of child activities 0, 1 or n times as determined by the composite activity. Beyond this flexibility to create new control flows, activities in a continuation based runtime have a number of distinct characteristics. For instance, such activities have no process affinity in that they can be paused in one process, and resumed in a different process, and may also run on different threads. Such activities can also be persisted into persistent storage for later rehydration back into memory.

Activities in a continuation based runtime are conventionally defined empirically in unmanaged code.

BRIEF SUMMARY

Embodiments described herein related to the defining and/or composition of activities in a continuation based runtime declaratively. In one embodiment, when formulating such a declarative activity of a continuation-based runtime, the activity is formulated in accordance with a declarative activity schema and includes a properties portion that declaratively defines one or more interface parameters of the declarative activity, and a body portion that declaratively defines an execution behavior of the declarative activity. In one embodiment, the declarative activities may be hierarchically structured such that a parent declarative activity may use one or more child activities to define its behavior, where one or more of the child activities may also be defined declaratively. Other embodiments related to the declarative activity schema itself.

By defining the activities declaratively, reasoning regarding the structure of the activity is not relegated to just the compiler. Instead, higher level logic (such as the runtime itself) may perform appropriate reasoning regarding the structure of the activity. The activity may thus be validated, analyzed, tooled and subjected to other types of investigation to facilitate a more comprehensive processing of the activity at higher levels. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, activities of a continuation based runtime may be declaratively defining and/or composed. In one embodiment, when formulating such a declarative activity of a continuation-based runtime, the activity is formulated in accordance with a declarative activity schema and includes a properties portion that declaratively defines one or more interface parameters of the declarative activity, and a body portion that declaratively defines an execution behavior of the declarative activity. In one embodiment, the declarative activities may be hierarchically structured such that a parent declarative activity may use one or more child activities to define its behavior, where one or more of the child activities may also be defined declaratively. Other embodiments relate to the declarative activity schema itself. By defining the activities declaratively, reasoning regarding the structure of the activity is not relegated to just the compiler. Instead, higher level logic (such as the runtime itself or third-party analysis tools) may perform appropriate reasoning regarding the structure of the activity.

First, some introductory discussion a computing system in which the principles described herein may be employed will be described with respect to FIG. 1. Then, various embodiments of the defining and composing declarative activities will be described with respect to FIGS. 2 through 5

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
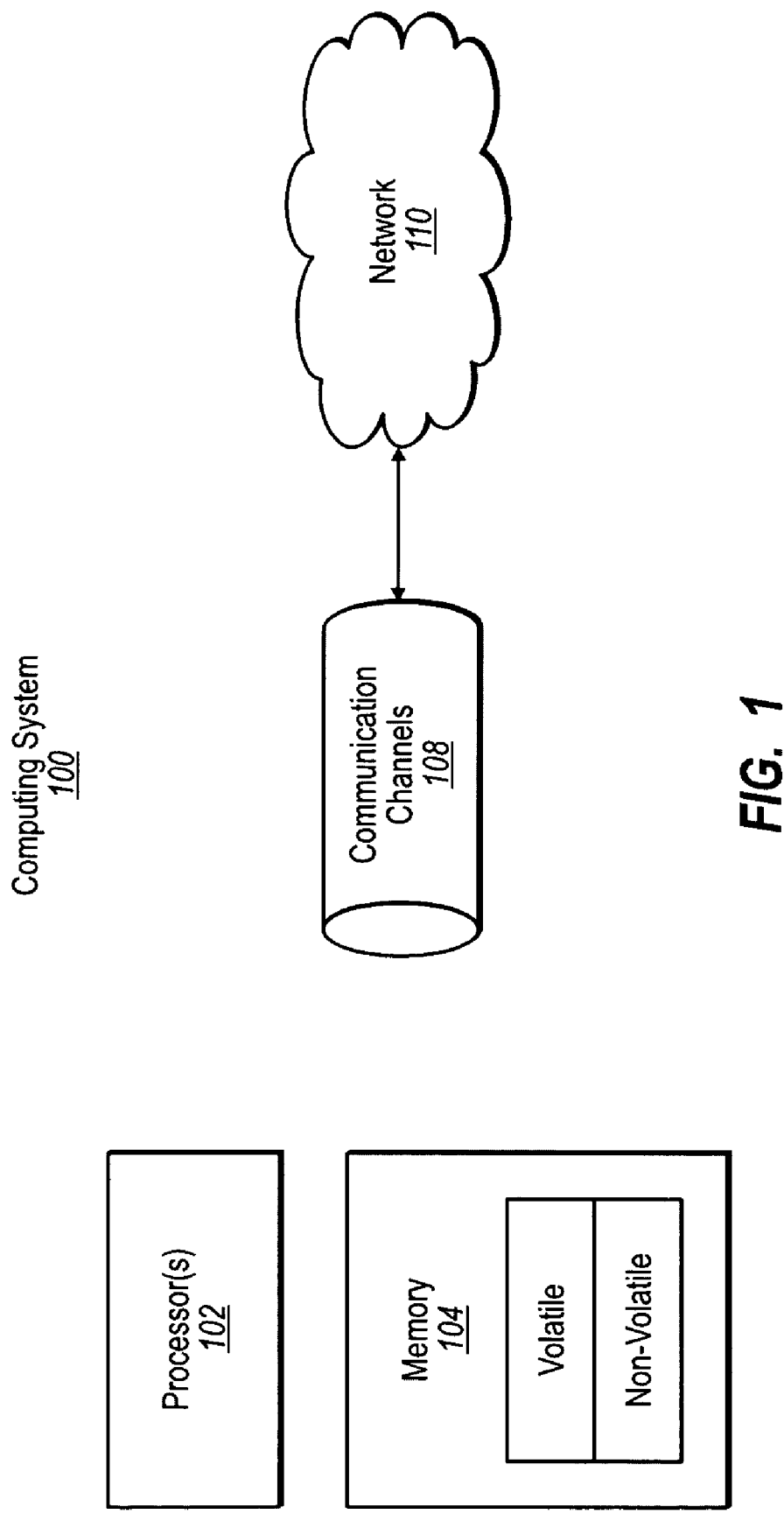
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system TOO.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
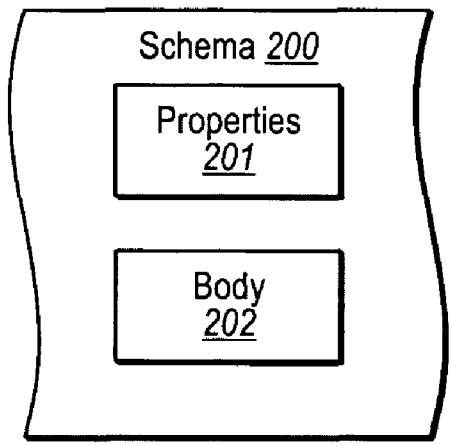
FIG. 2 schematically illustrates a data structure of a declarative activity schema of a continuation-based runtime.

FIG. 2 illustrates a data structure of a declarative activity schema 200 of a continuation-based runtime. The declarative activity schema 200 includes a properties portion 201 and a body portion 202.

The property portion 201 represents a portion where interface parameter(s) may be declaratively specified for declarative activities that conform with the declarative activity schema. The interface parameter(s) represent input parameters, output parameters, and/or input and output bi-directional parameters for the activity. They represent locations into which an external entity may place an input parameter, and locations into which the activity may place an output parameter for retrieval by the external entity. In one embodiment, the properties portion 201 is optional, or may perhaps even contain no parameters at all for activities that do not use input or output parameters.

The body portion 202 specifying a portion at which an execution behavior may be specified in conforming declarative activities. In one embodiment, the body portion 202 is flexible enough to include one or a plurality of child activities. The child activities could themselves be declarative activities, although that is not required. The child activities might also be represented non-declaratively in unmodeled, native code (also referred to herein as "primitive activities"). The child activities might also include a mix of one or more declarative activities and one or more primitive activities. Even those activities that do conform to a declarative schema definition need not (but may) conform to the same declarative schema definition. The execution behavior may operate upon at least one of the one of more interface parameters of the declarative activity.

Figure 3:
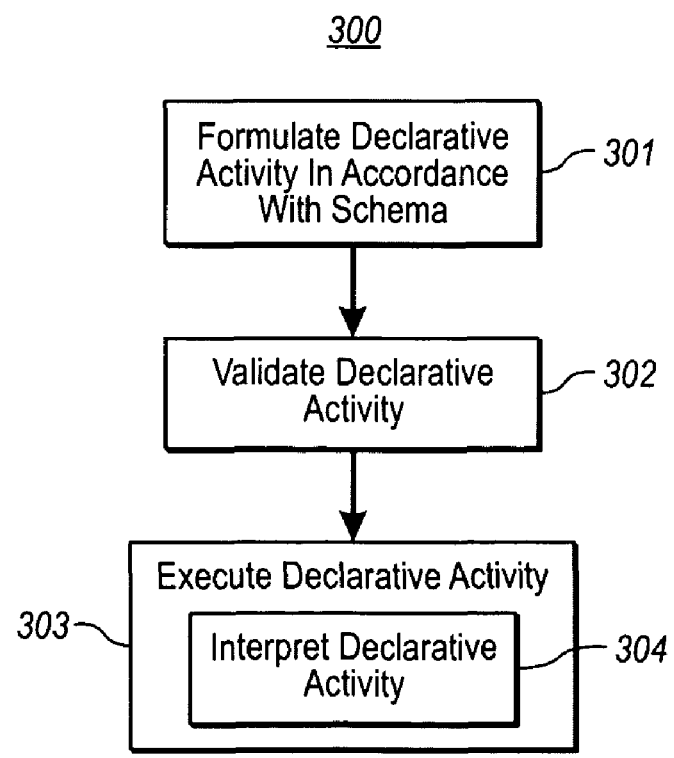
FIG. 3 illustrates a flowchart of a method for forming and using a declarative activity of a continuation-based runtime.

FIG. 3 illustrates a flowchart of a method 300 for forming and using a declarative activity of a continuation-based runtime. First, the declarative activity is formed in accordance with a declarative activity schema (act 301). This may be accomplished by a programmer, by a computing system at the direction of a programmer, or even by a computing system without being directed by a programmer. If directed by a programmer, the programmer themselves need not actually write the declarative activity, but perhaps might have just directed the formation at a high level. For instance, the programmer might have been provided with a tool whereby they might drag and drop visual representations of activities into another visual representation of an activity, to thereby compose activities out of constituent activities. The underlying tools may then formulate the appropriate declarative activity based on the programmers high-level input. Of course, there are other types of high level programmer input possible.

After formulating the declarative activity in conformance with the schema (act 301), a number of things might be done with that declarative activity. One example is that perhaps the declarative activity might be validated (act 302) to ensure as conformance with the declarative activity. This might be more beneficial if, for example, there is a higher possibility of error in originally formulating the declarative activity. This might occur if, for example, a human programmer directly authored the various declarative assertions of the declarative activity.

As another possibility, the declarative activity may be executed (act 303). As part of this execution, the declarative activity may be interpreted (act 304). A method for executing a declarative activity is described in commonly-assigned, co-pending application Ser. No. 12/040,567 filed Feb. 29, 2008, to which this patent application claims priority, and which is incorporated herein by reference in its entirety.

Figure 4:
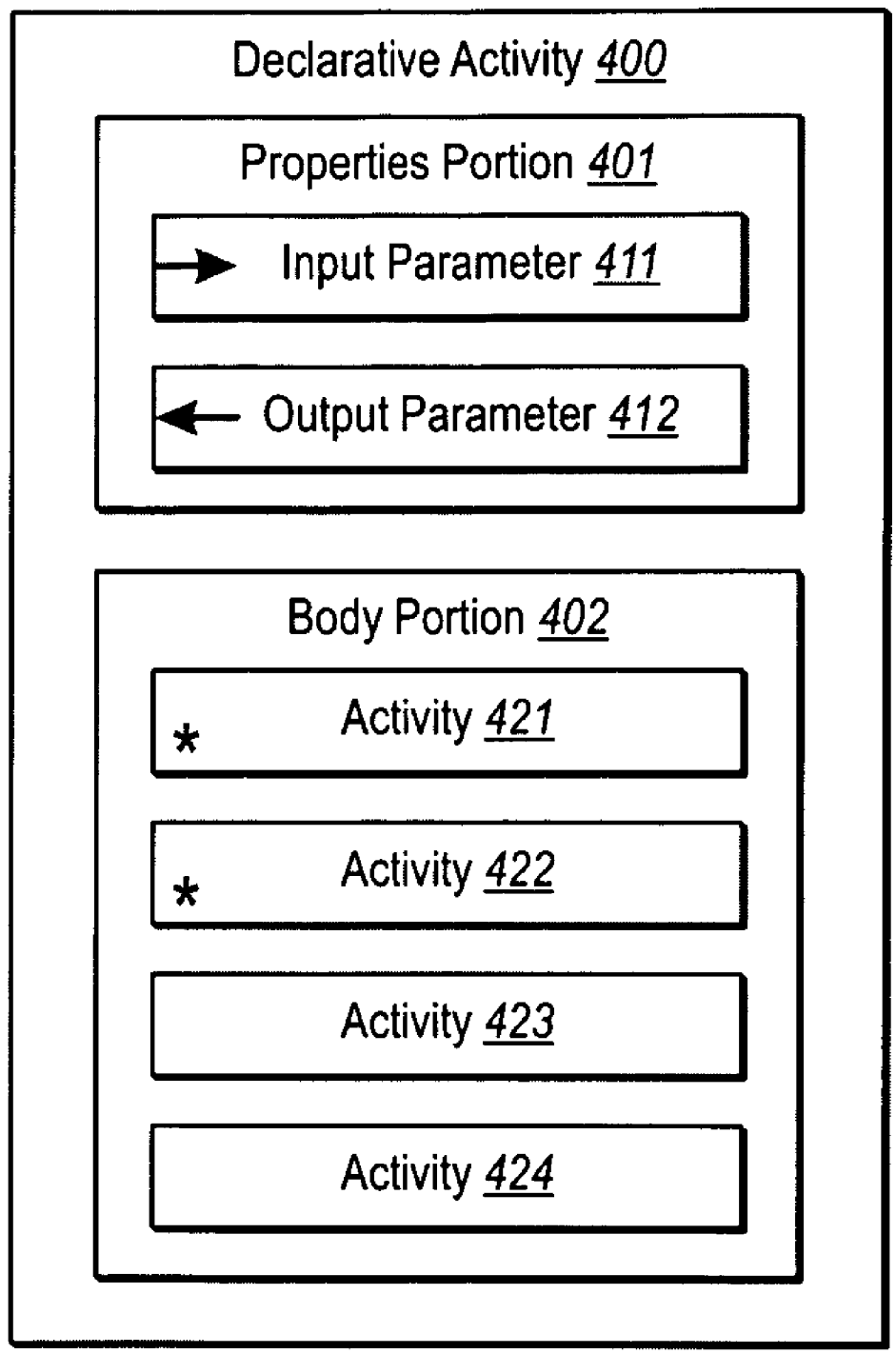
FIG. 4 schematically illustrates an example declarative activity constructed in conformity with the declarative activity schema.

FIG. 4 schematically illustrates an example declarative activity 400 that conforms to schema 200 of FIG. 1. The declarative activity 400 includes a properties portion 401 and a body portion 402. The properties portion 201 includes two parameters, and input parameter 411 and an output parameter 412. The parameter 411 is symbolically represented as being an input parameter by the rightward facing arrow. The parameter 412 is symbolically represented as being an output parameter as represented by the leftward facing arrow.

The body portion 402 includes a number of descendent activities 421 through 424. Some of those constituent activities are themselves declarative activities. For instance, activities 421 and 422 are marked with an asterisk to represent that these activities are defined declaratively. The activities 423 and 424 are primitive activities and are thus not defined declaratively, but are instead defined using unmodeled, native code.

A particular example of an activity called "Prompt" will now be set forth as follows with line numbering added for clarity and for purposes of subsequent reference:

```
1.  <Activity x:Name="Prompt">
2.    <Activity.Properties>
3.      <Property x:Name="Message" Type="InArgument(s:String)" />
4.      <Property x:Name="Result" Type="OutArgument(s:String)" />
5.    </Activity.Properties>
6.    <Activity.Body>
7.      <Sequence>
8.        <Sequence.Variables>
9.          <Variable Name="Response" Type="s:String" />
10.       </Sequence.Variables>
11.       <WriteLine Text="[Message]" />
12.       <ReadLine Result="[Response]" />
13.       <WriteLine Text="['The user entered: ' + Response]" />
14.       <Assign To="[Result]" Value="[Response]" />
15.     </Sequence>
16.   </Activity.Body>
17. </ActivityDescription>
```

In this particular activity example, the activity is expressed declaratively using XAML formatting. Lines 1-17 represent the entire parent activity, which is called "Prompt" and contains a number of child activities. Lines 2-5 include the input and output properties of the activity. In particular, line 3 defines an activity input property called "Message" of type string. Line 4 defines an activity output property called "Result" also of type string. These properties define the how the activity is exposed to its environment. In this example, when using the "Prompt" activity, a string value will be provided by the calling activity or entity (referred to as "Message" in the example, and the resulting string from the activity will be returned back to the calling entity (referred to as "Result" in the example). The properties may also be operated upon in the body of the activity.

Lines 6-16 define the actual body of the activity including local variable declarations, as well as a sequence of child activities to be performed. The body defines the behavior of the activity. The body is defined by declaratively instantiating other predefined activities. These activities' properties are set using expressions that may refer to the symbols introduced in the activity's property definition. The properties declared by an activity in the property portion of the activity can be referenced by the expressions used in the body portion of the activity.

The body of the activity includes a single child activity called "Sequence" spanning from lines 7-15. In this case, the Sequence activity is itself a declarative activity including multiple child activities specified in a declarative way. A sequence activity executes its child activities in a sequence, one after the other, in the order presented in the sequence.

In lines 8-10, the local variables for the sequence are defined. In particular, line 9 defines a local variable called "Response", which is declared to be of type string. Together, the parameters and variables of an activity become the dereferenceable locations in the environment of the activity.

Lines 11-14 define a sequence of child activities to be performed as part of the Sequence child activity, which is performed as part of the overall Prompt activity. In particular, the first child activity in line 11 is a "WriteLine" activity, which receives as an input parameter "Text". "Text" is a WriteLine activity argument that is set equal to an expression called "[Message]". In the syntax presented in the example, expressions are bounded by square brackets "[" and "]". In this example, such expressions are used to bind parameter arguments (such as "Text") to the environment (e.g., to the parent activity parameters "Message" and "Result", and local variables "Response").

Returning to the XAML example, the [Message] expression will resolve to a value, which is whatever value was passed in with the input parameter "Message" of type string in the parent "Prompt" activity.

In line 12, there is a "ReadLine" activity, which also has an output parameter called "Result" which is set equal to a location expression "[Response]". Here, this is a location expression, which resolves to a location where a value is, rather than a value itself In particular, the location that it resolves to is simply the variable "Response". In other words, the output parameter "Result" of the ReadLine activity is set equal to whatever value is stored at the location identified by the variable "Response".

In line 13, there is a WriteLine activity of line 13. Here, the input parameter Text is set equal to the expression "['The user entered:'+Response]", which is a string format expression in compound form. During execution, this expression is resolved into the literal value "The user entered: 35 Years Old". This literal value is written to the display using the WriteLine activity of line 13 of the "Prompt" activity.

In line 14, the Assign activity assigns the resolved value of the expression [Response], which has been resolved to "35 Years Old", to the resolved location value of the expression "[Result]", which is the location of the output parameter for the entire "Prompt" activity. When the "Prompt" activity returns, it will return the value "35 Years Old" as its output parameter.

As previously mentioned, a number of things can be done with a declarative activity such as, for example, validation, analysis, and execution. An activity might also be used as a constituent activity. In other words, once a declarative activity is formed, that declared activity may be made available in a library of pre-defined activities that may be used to compose yet other activities. That library may include declarative activities or primate activities.

Figure 5:
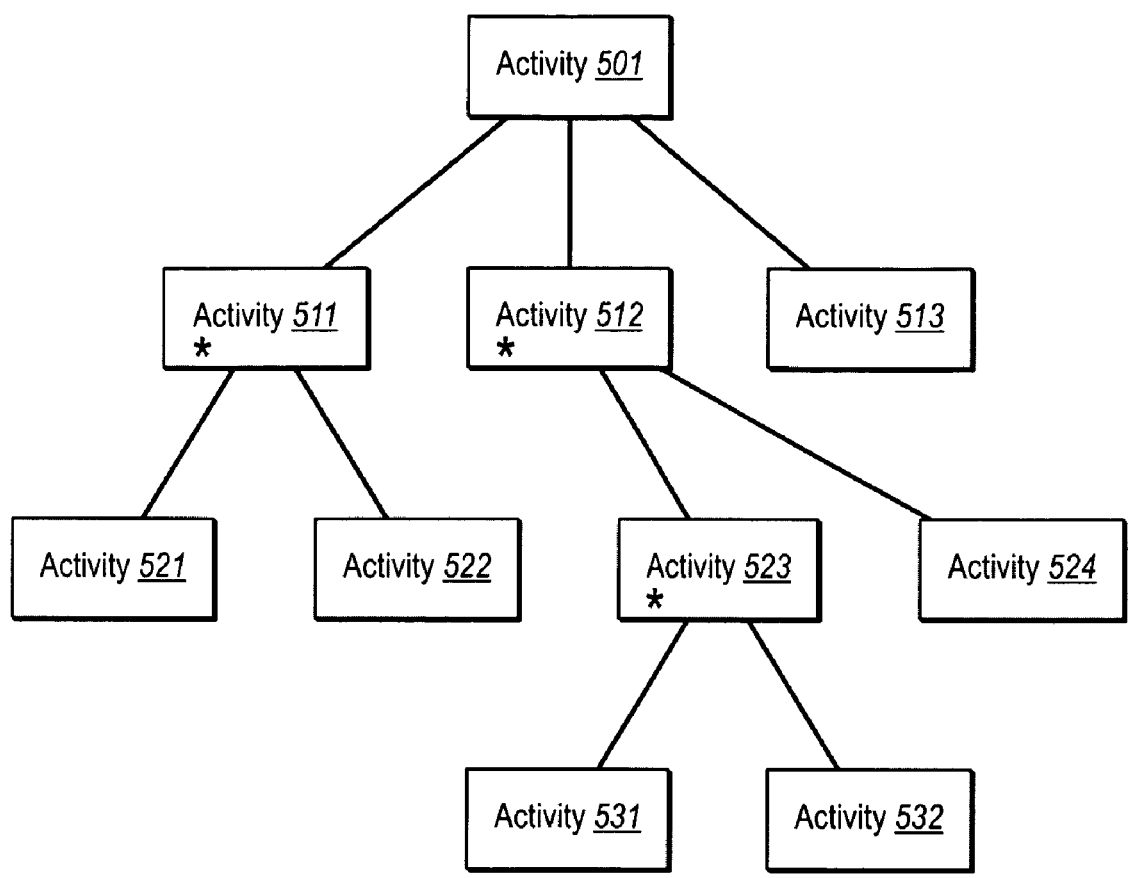
FIG. 5 illustrates a hierarchically structured declarative activity.

FIG. 5 illustrates an example 500 of a hierarchically structure of activities. Of course, a declarative hierarchical activity may take any form. Activity 501 is the root node in the hierarchy, but was the last to be formulated. The activity 501 is composed of pre-defined activities 511, 512 and 513, which together define the behavior of the activity 501.

The activity 513 is a primitive activity in this example. However, the activities 511 and 512 are also declarative as symbolized by the asterisk associated with each. Accordingly, the activities 511 and 512 are also each composed by including associated pre-defined activities. For instance, activity 511 includes pre-defined activities 521 and 522, and are used to define the behavior of the parent activity 511. Activity 512 also includes constituent pre-defined child activities 523 and 524. Activity 523 is declaratively defined, activity 524 is not. Activity 523 has two child activities, activity 531 and 532, both of which are primitives.

The following illustrates an example of how a pre-defined declarative activity can be used as a constituent activity in the body of yet another declarative activity. The previous example provided a declarative activity called "Prompt" which basically wrote some text onto a display, received user input, then output the result on the display. The following is a declarative activity called "Prompt2" which includes two instances of the Prompt declarative activity. Line numbering is added for clarity and for subsequent reference.

```
1.   <Activity x:Name="Prompt2">
2.     <Activity.Properties>
3.       <Property x:Name="Message1" Type="InArgument(s:String)" />
4.       <Property x:Name="Result1" Type="OutArgument(s:String)" />
5.       <Property x:Name="Message2" Type="InArgument(s:String)" />
6.       <Property x:Name="Result2" Type="OutArgument(s:String)" />
7.     </Activity.Properties>
8.     <Activity.Body>
9.       <Sequence>
10.        <Prompt Message="[Message1]" Result="out [Result1]" />
11.        <Prompt Message="[Message2]" Result="out [Result2]" />
12.      </Sequence>
13.    </Activity.Body>
14.  </Activity>
```

Lines 1-14 represents the entirety of the declarative activity named "Prompt2". Once again, the activity is set forth using XAML. Lines 2-7 define the various parameters of the Prompt2 activity. Specifically, there are two input parameters called Message1 and Message2 (see lines 3 and 5, respectively). In addition, there are two output parameters called Result1 and Result2 (see lines 2 and 4, respectively).

Lines 8-13 define the body of the activity and include one child activity called Sequence. The Sequence activity spans from lines 9-12, and includes two instances of the Prompt activity that are executed in sequence. Each of the Prompt activities may be structured as described above in the previous example. The first instance occurs at line 10 and receives Message 1 as an input, and outputs Result1. The second instance occurs at line 11 and receives Message 2 as an input, and outputs Result2.

For instance, during execution of the first instance of Prompt, the text "Please enter your age" might be displayed, whereupon the user might enter "30". As part of the execution of the first Prompt instance, the following might be displayed "The user entered 30". Subsequently, during the execution of the second instance of Prompt, the text "Please enter your gender", whereupon the user might enter "Male". As part of the execution of the second Prompt instance, the following might be displayed "The user entered Male".

Accordingly, the principles described herein permit for the declarative definition and composition of activities. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system including a continuation-based runtime, a method for forming a declarative activity for execution in the continuation-based runtime, the method comprising:
   an act of receiving input in a declarative language that defines a parent declarative activity in accordance with a declarative activity schema, the declarative activity including:
      a properties portion that declaratively defines one or more interface parameters of the declarative activity; and
      a body portion that declaratively defines an execution behavior of the parent declarative activity, wherein the body portion includes a plurality of child activities, at least one of the child activities being defined declaratively in accordance with the declarative activity schema, and at least one of the child activities being defined imperatively in native code;
   an act of validating that the parent declarative activity as well as each child activity that is defined declaratively is in conformance with the declarative activity schema; and
   an act of executing the parent declarative activity including executing the at least one child activity that is defined declaratively and the at least one child activity that is defined imperatively.

2. The method in accordance with claim 1, wherein the execution behavior operates upon at least one of the one or more interface parameters of the declarative activity.

3. The method in accordance with claim 1, wherein the properties portion is a first properties portion, the one or more interface parameters are first one or more interface parameters, the body portion is a first body portion, and the execution behavior is a first execution behavior, the method further comprising:
   an act of formulating a second declarative activity in accordance with the declarative activity schema, the second declarative activity including:
      a second properties portion that declaratively defines second one or more interface parameters of the second declarative activity; and
      a second body portion the declaratively defines a second execution behavior of the second declarative activity.

4. The method in accordance with claim 3, wherein the second body portion includes a plurality of child declarative activities, at least one of the child declarative activities being the parent declarative activity.

5. The method in accordance with claim 3, wherein the second body portion includes a plurality of child declarative activities, at least some of which being instances of the parent declarative activity.

6. The method in accordance with claim 1, wherein the act of executing the parent declarative activity further comprises:
   an act of interpreting the parent declarative activity.

7. In a computer system including a continuation-based runtime, a method, performed by the continuation-based runtime executing on the computer system for forming a declarative activity for execution in the continuation-based runtime, the method comprising:
   an act of formulating a definition of a first declarative activity in accordance with a declarative activity schema in the Extensible Application Markup Language (XAML) declarative language, the first declarative activity specifying a first execution behavior, the definition of the first declarative activity including a properties tag and a body tag nested within an activity tag, wherein the properties tag further includes nested therein one or more property tags that each define an input or an output of the first declarative activity, and wherein the body tag further includes nested therein a sequence tag containing a sequence of child declarative activities that when executed implement the first execution behavior; and an act of formulating a definition of a second declarative activity in accordance with the declarative activity schema in the XAML declarative language, the second declarative activity specifying a second execution behavior, the definition of the second declarative activity including a properties tag and a body tag nested within an activity tag, wherein the properties tag further includes nested therein one or more property tags that each define an input or an output of the second declarative activity, and wherein the body tag further includes nested therein one or more instances of the first declarative activity that when executed implement the second execution behavior.

8. The method in accordance with claim 7, wherein the one or more instances of the first declarative activity operate on one or more of the one or more inputs or outputs of the second declarative activity.

9. The method in accordance with claim 8, wherein the body tag of the second declarative activity includes a plurality of instances of the first declarative activity, wherein the method further comprises:

executing the second declarative activity by executing each of the plurality of instances of the first declarative activity in sequence.

10. A computer program product comprising one or more computer-readable media-storage devices having stored thereon computer executable instructions which when executed in a computer system including a continuation-based runtime, perform a method for forming a declarative activity for execution in the continuation-based runtime, the method comprising:

an act of receiving input in a declarative language that defines a parent declarative activity in accordance with a declarative activity schema, the declarative activity including:
   a properties portion that declaratively defines one or more interface parameters of the declarative activity; and
   a body portion that declaratively defines an execution behavior of the parent declarative activity, wherein the body portion includes a plurality of child declarative activities, at least one of the child declarative activities being defined declaratively in accordance with the declarative activity schema, and at least one of the child development activities being defined imperatively in native code;

an act of validating that the parent declarative activity as well as each child declarative activity that is defined declaratively is in conformance with the declarative activity schema; and an act of executing the parent declarative activity including executing the at least one child declarative activity that is defined declaratively and the at least one child declarative activity that is defined imperatively.

* * * * *

UNITED STATES PATENT AND TRADEMARK OFFICE
CERTIFICATE OF CORRECTION

PATENT NO.         : 8,191,042 B2                                                Page 1 of 1
APPLICATION NO.    : 12/060794
DATED              : May 29, 2012
INVENTOR(S)        : Pinto et al.

It is certified that error appears in the above-identified patent and that said Letters Patent is hereby corrected as shown below:

In the Specification

Column 3, line 24, delete "TOO." and insert -- 100. --, therefor.

Column 4, line 56, after "ensure" delete "as".

Column 6, line 30, after "itself" insert -- . --.

In the Claims

Column 8, line 43, Claim 3, delete "the" and insert -- that --, therefor.

Column 10, line 2, Claim 10, after "readable" delete "media-".

Signed and Sealed this
Third Day of February, 2015

Michelle K. Lee
*Deputy Director of the United States Patent and Trademark Office*